United States Patent
Deslauriers

(10) Patent No.: US 10,766,720 B2
(45) Date of Patent: Sep. 8, 2020

(54) SHOCK ABSORBING DOCK LEVELER LIP

(71) Applicant: PRODUITS HEVEA INC., Richmond, Québec (CA)

(72) Inventor: Jean Deslauriers, Richmond (CA)

(73) Assignee: PRODUITS HEVEA INC., Richmond (Quebec) (CA)

( * ) Notice: Subject to any disclaimer, the term of this patent is extended or adjusted under 35 U.S.C. 154(b) by 0 days.

(21) Appl. No.: 16/268,597

(22) Filed: Feb. 6, 2019

(65) Prior Publication Data

US 2019/0241380 A1   Aug. 8, 2019

Related U.S. Application Data

(60) Provisional application No. 62/626,848, filed on Feb. 6, 2018.

(51) Int. Cl.
*E01D 1/00* (2006.01)
*B65G 69/28* (2006.01)

(52) U.S. Cl.
CPC .................. *B65G 69/2841* (2013.01)

(58) Field of Classification Search
CPC ............ B65G 69/28; B65G 69/2805; B65G 69/2811; B65G 69/2823; B65G 69/2841; B65G 69/2876; B65G 69/30
USPC .......................................................... 14/71.1
See application file for complete search history.

(56) References Cited

U.S. PATENT DOCUMENTS

| | | | |
|---|---|---|---|
| 1,586,908 A * | 6/1926 | McDowell | B65G 69/30 193/41 |
| 3,329,984 A * | 7/1967 | Akers | B65G 69/2841 14/71.5 |
| 3,933,256 A * | 1/1976 | Fagerlund | B63B 27/143 14/71.7 |
| 4,853,999 A * | 8/1989 | Smith | B65G 69/287 14/69.5 |
| 5,287,580 A * | 2/1994 | Nelson | B65G 69/30 14/71.3 |
| 5,311,628 A * | 5/1994 | Springer | B65G 69/2823 14/71.1 |
| 5,343,583 A * | 9/1994 | Cook | B65G 69/2841 14/71.1 |
| 6,185,775 B1 * | 2/2001 | McCarthy | B60P 1/43 14/69.5 |
| 6,484,343 B1 * | 11/2002 | Phillips | B65G 69/30 14/69.5 |
| 6,536,363 B1 * | 3/2003 | Carlberg | B63B 27/143 114/72 |

(Continued)

FOREIGN PATENT DOCUMENTS

| | | | | |
|---|---|---|---|---|
| DE | 1531803 A1 * | 1/1970 | ......... | B65G 69/2811 |
| DE | 2634652 A1 * | 2/1978 | ......... | B65G 69/2811 |
| DE | 3049611 A1 * | 7/1982 | ......... | B65G 69/2823 |

*Primary Examiner* — Thomas B Will
*Assistant Examiner* — Katherine J Chu
(74) *Attorney, Agent, or Firm* — Conley Rose, P.C.

(57) ABSTRACT

A lip hingedly connectable to a deck of a dock leveler, the lip comprising an elongated body having opposite top and bottom surfaces. The elongated body comprising a hinged edge removably and pivotally connectable to the deck; and a distal edge opposite the hinged edge. The lip further comprises a cover lining adapted to at least partially enclose the top and bottom surfaces of the elongated body so as to mitigate impacts thereon.

19 Claims, 8 Drawing Sheets

(56) References Cited

U.S. PATENT DOCUMENTS

| | | | | |
|---|---|---|---|---|
| 7,179,042 B1* | 2/2007 | Hartmann | | B65G 69/30 14/69.5 |
| 7,299,517 B1* | 11/2007 | Adinolfe | | B65G 69/30 14/69.5 |
| 8,443,474 B2* | 5/2013 | Sveum | | B05D 5/02 14/69.5 |
| 9,284,135 B2* | 3/2016 | Sveum | | B65G 69/2811 |
| 9,944,475 B1* | 4/2018 | Leum | | B65G 69/2876 |
| 2003/0196288 A1* | 10/2003 | Kessler | | A47L 23/266 15/215 |
| 2004/0128943 A1* | 7/2004 | Herbert | | B65G 69/2876 52/716.1 |
| 2008/0184501 A1* | 8/2008 | Vering | | B65G 69/2811 14/71.1 |
| 2008/0184503 A1* | 8/2008 | Andersen | | B65G 69/2823 14/71.3 |
| 2009/0178349 A1* | 7/2009 | Schmidt | | B65G 69/008 52/173.2 |
| 2010/0017976 A1* | 1/2010 | Metz | | B65G 69/287 14/69.5 |
| 2010/0032918 A1* | 2/2010 | Chamoun | | B62D 63/061 280/30 |
| 2010/0319143 A1* | 12/2010 | Wessel | | B65G 69/008 14/71.1 |
| 2011/0010871 A1* | 1/2011 | Metz | | B65G 69/2876 14/69.5 |
| 2012/0204360 A1* | 8/2012 | Chamoun | | B62D 63/061 14/2.4 |
| 2013/0019418 A1* | 1/2013 | Chen | | E04F 11/002 14/71.1 |
| 2015/0047132 A1* | 2/2015 | Sveum | | B65G 69/2882 14/71.1 |
| 2015/0052693 A1* | 2/2015 | Allen | | A61G 3/061 14/71.1 |
| 2017/0253164 A1* | 9/2017 | Delanghe | | B60P 1/43 |

* cited by examiner

SHOCK ABSORBING DOCK LEVELER LIP

CROSS-REFERENCE TO RELATED APPLICATIONS

This application claims priority to U.S. Provisional Application No. 62/626,848, filed Feb. 6, 2018, the entire contents of which are incorporated by reference herein.

TECHNICAL FIELD

The technical field generally relates to dock levelers, and more particularly to a lip pivotally connected to a dock leveler.

BACKGROUND

Most dock levelers are used in loading docks/loading bays of warehouses where goods are delivered to and/or from said warehouses, usually via a vehicle provided with a bed adapted for the transportation of goods (e.g. a truck, a trailer, a semi-trailer, a wagon, etc.). The dock leveler comprises a height-adjustable platform used to form a bridge between the loading dock and the bed of the vehicle. The platform generally includes a deck, attached within the warehouse, and a lip which extends from the deck to rest on the bed of the vehicle, effectively forming the aforementioned bridge. The lip is pivotally connected to the deck in order to adjust itself accordingly when resting within the truck.

This bridge formed by the dock leveler can be used by workers or power moving equipment (e.g. a forklift) to facilitate loading and unloading of the vehicle. The frequent use of the dock levelers, especially by forklifts, or other heavy equipment, makes it often necessary to provide maintenance and upkeep to the different parts. Moreover, these parts are generally made of metal which can sometimes present security issues, such as sharp edges, and excessive vibrations and/or noise.

Hence, in light of the aforementioned, there is a need for a dock leveler which, by virtue of its design and components, would be able to overcome or at least minimize some of the aforementioned prior art problems.

The Applicant has surprisingly discovered that the abovementioned drawbacks are now overcome with the various aspects of a lip, a lip attachment and a kit defined hereinafter.

SUMMARY

According to a first aspect, a lip hingedly connectable to a deck of a dock leveler is provided. The lip comprises an elongated body having opposite top and bottom surfaces. The elongated body comprises a hinged edge removably and pivotally connected to the deck and a distal edge opposite the hinged edge. The elongated body also comprises a cover lining adapted to at least partially enclose the top and bottom surfaces of the elongated body so as to mitigate impacts thereon.

According to possible embodiments, the cover lining includes a leading edge extending further than the distal edge. Advantageously, said leading may be tapered.

According to another possible embodiment, the leading edge comprises at least one recess positioned therealong.

According to another possible embodiment, the elongated body is substantially flat, and the distal edge is downwardly inclined with respect to the elongated body.

According to another possible embodiment, the distal edge is between about 0.5 and about 20 degrees.

According to another possible embodiment, the elongated body is made from a metallic material.

According to another possible embodiment, the cover lining is made of rubber crosslinked through a vulcanization process, the rubber being adapted to absorb and/or mitigate impacts, shocks, vibrations and/or noises.

According to another possible embodiment, the rubber has a hardness between about 50 and 90 on the durometer scale.

According to another possible embodiment, the rubber is further reinforced with fibers, fabrics and/or felts.

According to another possible embodiment, the cover lining is attached to the elongated body via adhesive, mechanical fasteners and/or during the vulcanization process.

According to a second aspect, a lip hingedly connectable to a deck of a dock leveler is provided. The lip comprises an elongated body having opposite top and bottom surfaces. The elongated body comprises a hinged edge removably and pivotally connectable to the deck, a front edge opposite the hinged edge and a first connecting surface positioned along the front edge. The lip further includes a lip attachment which has opposite top and bottom surfaces. The lip attachment also includes a second connecting surface removably connectable to the first connecting surface, and a distal edge extending from the second connecting surface. The lip further includes a cover lining covering the top and bottom surfaces of at least one of the elongated body and lip attachment so as to mitigate impacts thereon.

According to a possible embodiment, the cover lining comprises a first portion adapted to at least partially cover the top and bottom surfaces of the elongated body.

According to another possible embodiment, the cover lining comprises a second portion adapted to at least partially cover the top and bottom surfaces of the lip attachment.

According to another possible embodiment, the second portion of the cover lining further comprises a leading edge extending further than the distal edge.

According to another possible embodiment, the leading edge is tapered.

According to another possible embodiment, the leading edge includes at least one recess positioned therealong.

According to another possible embodiment, the first and second connecting surfaces are substantially parallel to each other.

According to another possible embodiment, the elongated body is substantially flat, and wherein the first and second connecting surfaces are substantially parallel to the elongated body.

According to another possible embodiment, the distal edge is downwardly inclined with respect to the second connecting surface.

According to another possible embodiment, the inclination of the distal edge is between about 0.5 and about 20 degrees.

According to another possible embodiment, the second connecting surface is removably connectable to the first connecting surface via mechanical fasteners.

According to another possible embodiment, the elongated body and lip attachment are made from a metallic material.

According to another possible embodiment, the lip attachment is divided in a plurality of lip attachment sections, each lip attachment section being removably attachable to the elongated body.

According to another possible embodiment, the cover lining is made of rubber crosslinked through a vulcanization process, the rubber being adapted to absorb/mitigate impacts, shocks, vibrations and/or noises.

According to another possible embodiment, the rubber has a hardness between about 50 and 90 on the durometer scale.

According to another possible embodiment, the rubber is further reinforced with fibers, fabrics and/or felts.

According to another possible embodiment, the cover lining is attached to the elongated body and/or the lip attachment via adhesive, mechanical fasteners and/or during the vulcanization process.

According to a third aspect, a lip attachment removably connectable to a lip of a dock leveler is provided. The lip comprises an elongated body having opposite top and bottom surfaces, a hinged edge removably and pivotally connectable to the dock leveler, a front edge opposite the hinged edge and a first connecting surface positioned along said front edge. The lip attachment comprises opposite top and bottom surfaces, a second connecting surface removably connectable to the first connecting surface, a distal edge extending from the second connecting surface, and a cover lining covering the top and bottom surfaces of the lip attachment, the cover lining being adapted to mitigate impacts on said lip attachment.

According to a possible embodiment, the cover lining comprises a leading edge extending further than the distal edge.

According to another possible embodiment, the leading edge is tapered.

According to another possible embodiment, the leading edge includes at least one recess positioned therealong.

According to another possible embodiment, the first and second connecting surfaces are substantially parallel to each other.

According to another possible embodiment, the elongated body is substantially flat, and wherein the first and second connecting surfaces are substantially parallel to the elongated body.

According to another possible embodiment, the distal edge is downwardly inclined with respect to the second connecting surface.

According to another possible embodiment, the inclination of the distal edge is between about 0.5 and about 20 degrees.

According to another possible embodiment, the second connecting surface is removably connectable to the first connecting surface via mechanical fasteners.

According to another possible embodiment, the elongated body and lip attachment are made from a metallic material.

According to another possible embodiment, the lip attachment is divided in a plurality of lip attachment sections, each lip attachment section being removably attachable to the elongated body.

According to another possible embodiment, the cover lining is made of rubber crosslinked through a vulcanization process, said rubber being adapted to absorb and/or mitigate impacts, shocks, vibrations and/or noises.

According to another possible embodiment, the rubber has a hardness between about 50 and 90 on the durometer scale.

According to another possible embodiment, the rubber is further reinforced with fibers, fabrics and/or felts.

According to another possible embodiment, the cover lining is attached to the lip attachment via adhesive, mechanical fasteners and/or during the vulcanization process.

According to a fourth aspect, a kit comprising a lip hingedly connectable to a deck of a dock leveler and a lip attachment removably attachable to the lip for mitigating impacts, vibrations and/or noises thereon is provided.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

In addition, although the optional configurations as illustrated in the accompanying drawings comprises various components and although the optional configurations of a dock leveler lip as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and cooperations thereinbetween, as well as other suitable geometrical configurations may be used for the lip, and corresponding parts, as briefly explained and as can be easily inferred herefrom, without departing from the scope of the disclosure.

As will be explained below in relation to various embodiments, a dock leveler attachment, or "lip", is provided. As will be readily understood by a person skilled in the art, the expression "lip" refers to the movable/pivotable front end part of dock levelers. Moreover, it should also be understood that the lip can be adapted to facilitate loading and unloading of cargo from within vehicles, such as delivery trucks for example, by providing a bridge between the loading docks and the bed of the vehicle. As such, a forklift, or any other handling equipment, can roll onto and off the vehicle so as to effectively perform loading and/or unloading activities.

Figure 1:
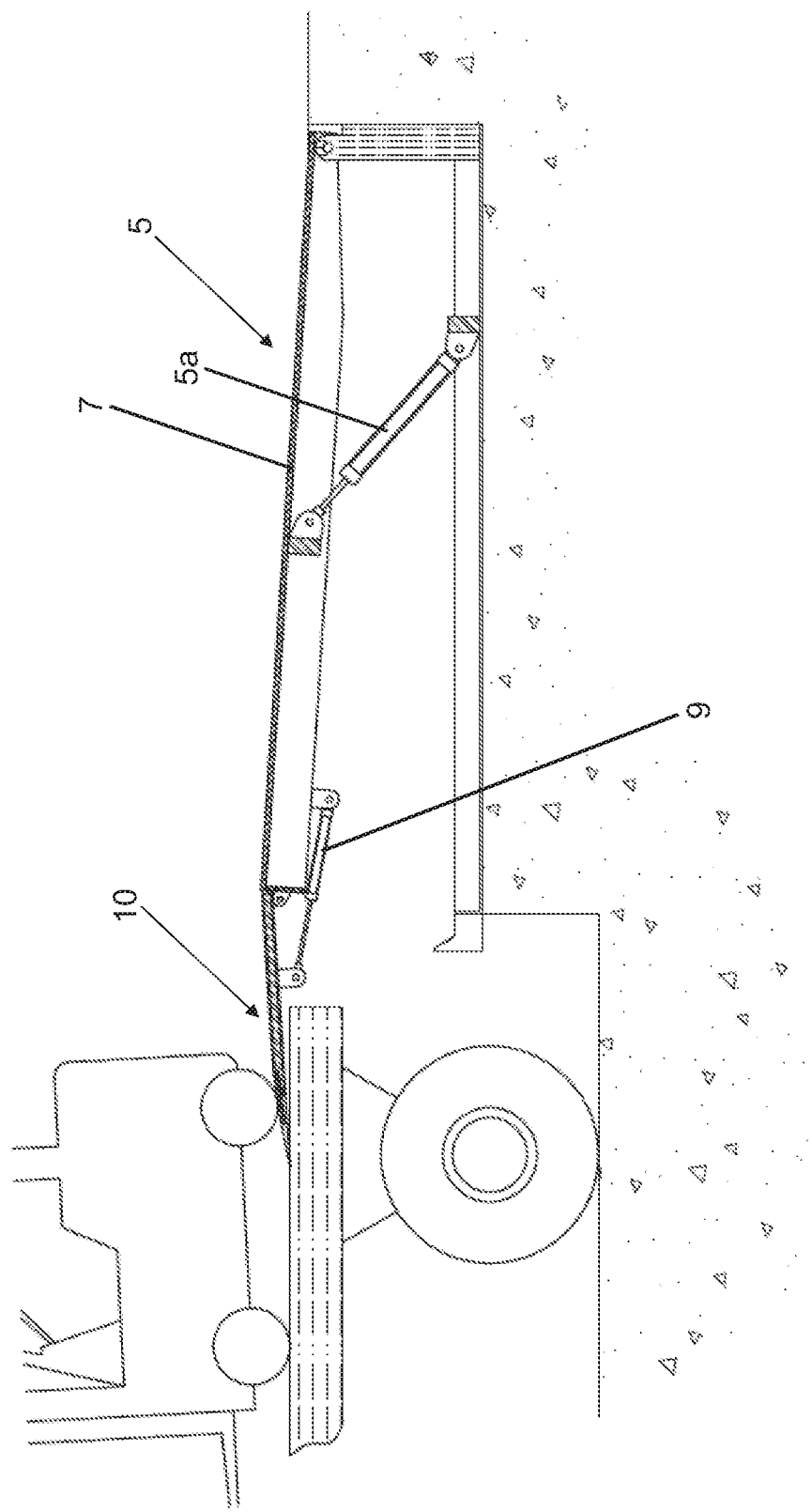
FIG. 1 is a side elevation view of a dock leveler comprising a deck and a lip, showing the cooperation between the lip and a bed of a vehicle allowing a forklift to access said vehicle, according to an embodiment.
Figure 2:
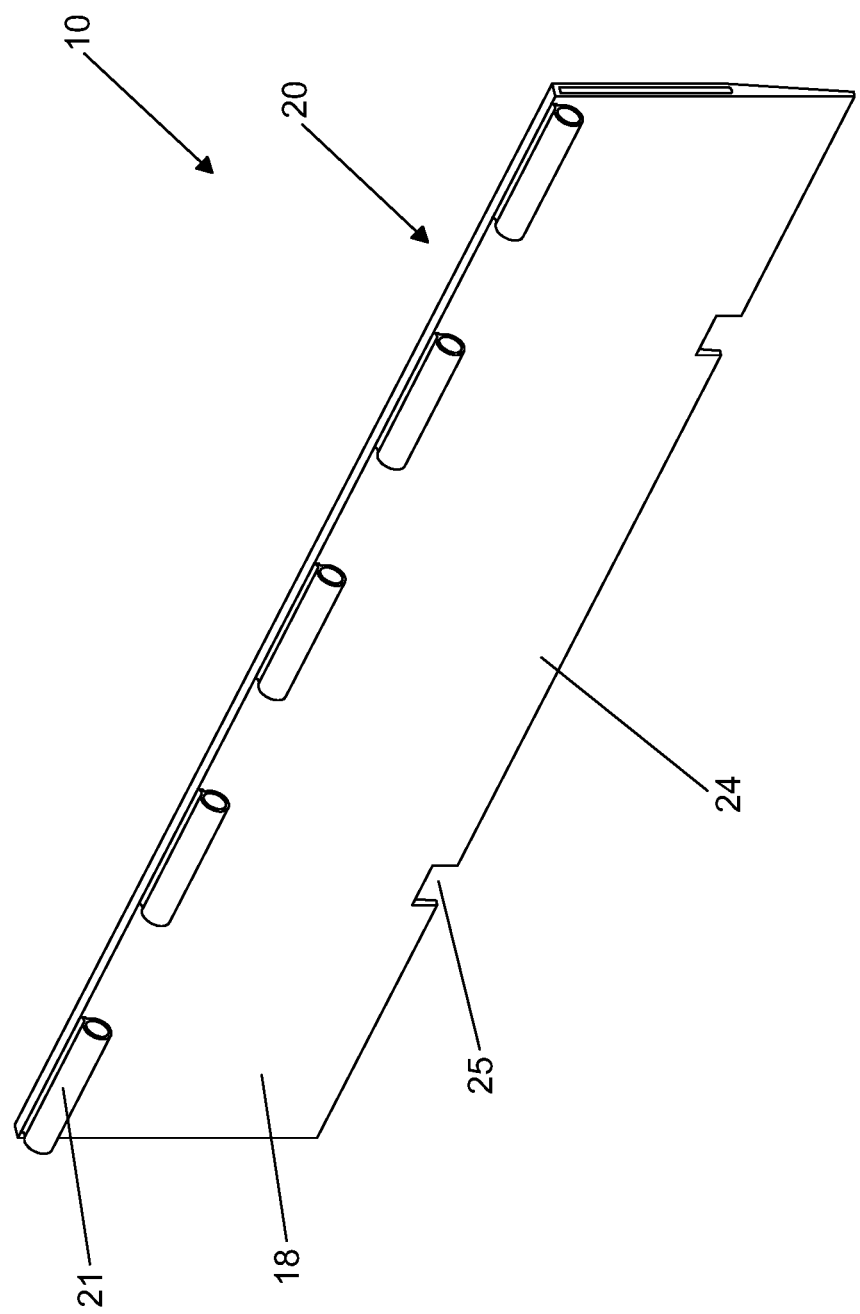
FIG. 2 is a bottom perspective view of a lip of a dock leveler, according to an embodiment.
Figure 3:
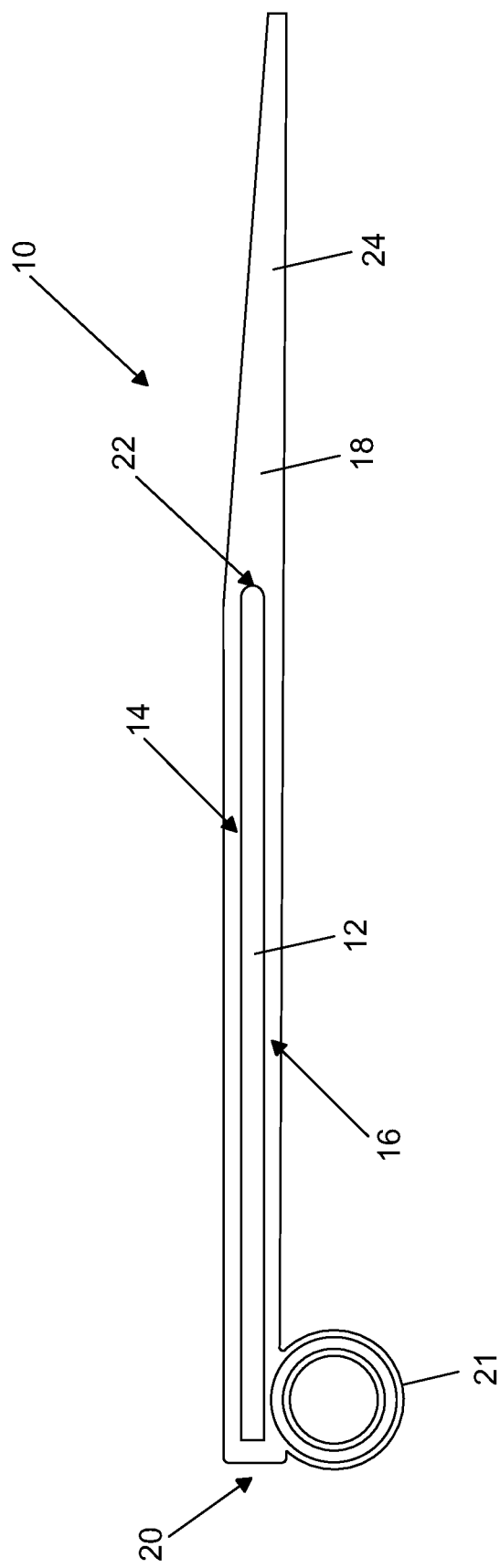
FIG. 3 is a cross-sectional view of the lip shown in FIG. 1, showing a cover lining surrounding an elongated body, according to an embodiment.

Referring to FIGS. 1 to 3, a lip 10 in accordance with one embodiment is shown. In this embodiment, the lip 10 is hingedly connected to a dock leveler 5, more specifically to a deck 7 of the dock leveler 5. As should be readily understood by a person skilled in the art, the deck 7 is displaceable/pivotable and maintained in various positions using any suitable means known in the art, such as hydraulic means 5a. It should be further understood that the lip 10 pivots about the hinges, optionally by actuating an actuation means. A non-limiting example of the actuation means may consist of a hydraulic cylinder 9. When the hydraulic cylinder 9 extends, the lip 10 pivots outwardly to form the aforementioned bridge between the deck 7 and the bed of a vehicle, and when the hydraulic cylinder 9 retracts, the lip 10 pivots in the opposite direction to return to a resting position. In some embodiments, the lip 10 includes an elongated body 12 (FIG. 3) having opposite top and bottom surfaces 14, 16 and a cover lining 18 adapted to at least partially enclose said top and/or bottom surfaces. In the present embodiment, the cover lining 18 encloses the elongated body 12 to provide protection to all the surfaces thereof. The cover lining 18 can be adapted to mitigate impacts that would occur on the lip 10 from external sources for example, such as a worker, a forklift or any other equipment engaging and/or moving on the lip 10.

Referring more specifically to FIG. 3, the elongated body 12 comprises a hinged edge 20 adapted to be removably and pivotally connectable to the deck 5 of the dock leveler 7, as illustrated in FIG. 1. More specifically, the hinged edge 20 comprises a plurality of hinges 21 configured to be connected with the deck 5 in a manner known in the art. Opposite said hinged edge 20, the elongated body 12 comprises a front edge 22, with a substantially flat surface extending between said edges. The elongated body 12 can have a rectangular shape, with the top surface 14 being parallel to the bottom surface 16, as seen in FIG. 3. However, it is appreciated that in other embodiments, the elongated body 12 can have different shapes and/or sizes, for example a rectangle with rounded corners, or simply a half-moon shape.

In this embodiment, the cover lining 18 illustratively encloses the top and bottom surfaces 14, 16 of the elongated body, including the hinged and front edges 20, 22. In some embodiments, the cover lining 18 can be attached to the elongated body 12 using an adhesive agent such as glue, or via mechanical fasteners such as screws or bolts, among other possibilities. In the present embodiment, the cover lining 18 comprises a leading edge 24 illustratively extending further than the front edge 22 to provide a flexible/durable outer edge to the lip 10. In this embodiment, the leading edge 24 is tapered so as to have a decreasing thickness as it extends away from said front edge 22 to facilitate loading and/or unloading of equipment, such as the aforementioned forklift. Having said decreasing thickness allows for wheeled-equipment (e.g. forklifts) to easily get on and over the lip 10 in order to access the vehicle the lip connects to.

In some embodiments, the elongated body 12 is made from a metallic material such as steel, but can alternatively be made from reinforced fibers, fabrics or any other suitable material. In this embodiment, the cover lining 18 is made from rubber so as to effectively absorb and/or mitigate impacts, shocks, vibrations and/or noises. The rubber surrounding the lip 10 can provide improved working conditions by effectively reducing impacts between workers (or equipment) and the lip 10 of the dock leveler, thus reducing noises and vibrations that would be caused by said impacts.

In some embodiments, the rubber can be crosslinked using a vulcanization process adapted to improve elasticity of the rubber material. In the present embodiment, the crosslinked rubber can have a hardness, as measured on the durometer scale, between about 50 and about 90, although it is appreciated that the crosslinked rubber can have any other suitable hardness. It should be readily understood by a person skilled in the art that the "durometer scale" references the standard for hardness measurement of rubber, plastic, and other non-metallic materials. Generally, most rubber materials are categorized under the durometer scale of Shore A. For example, a pencil eraser can have a rubber durometer of about 40 A, while a bowling ball can have a rubber durometer between about 90 A and 100 A. In some embodiments, the cover lining 18 can be made of reinforced rubber, being reinforced using fibers, fabrics, felts and/or any other known material used in reinforcing vulcanized rubber, as apparent to a person skilled in the art. It should be understood that any material used to reinforce said rubber needs to be adapted to resist the temperatures associated with the vulcanization process. In some embodiments, the cover lining 18 can be attached to the elongated body 12 during said vulcanization process. More specifically, the elongated body 12 and cover lining 18 can be fitted in a mold where the rubber of the cover lining is vulcanized, effectively making the rubber adhere to the metal of the elongated body 12 due to the high temperatures associated with the process.

Referring back to FIG. 2, the leading edge 24 can be provided with recesses 25 adapted to provide additional flexibility to said leading edge 24. In this embodiment, the leading edge 24 is provided with two recesses, but can alternatively be provided with a single recess or more than two. Finally, the recesses 25 can have any suitable shape and size so as to provide the needed flexibility in any given situation.

Figure 4:
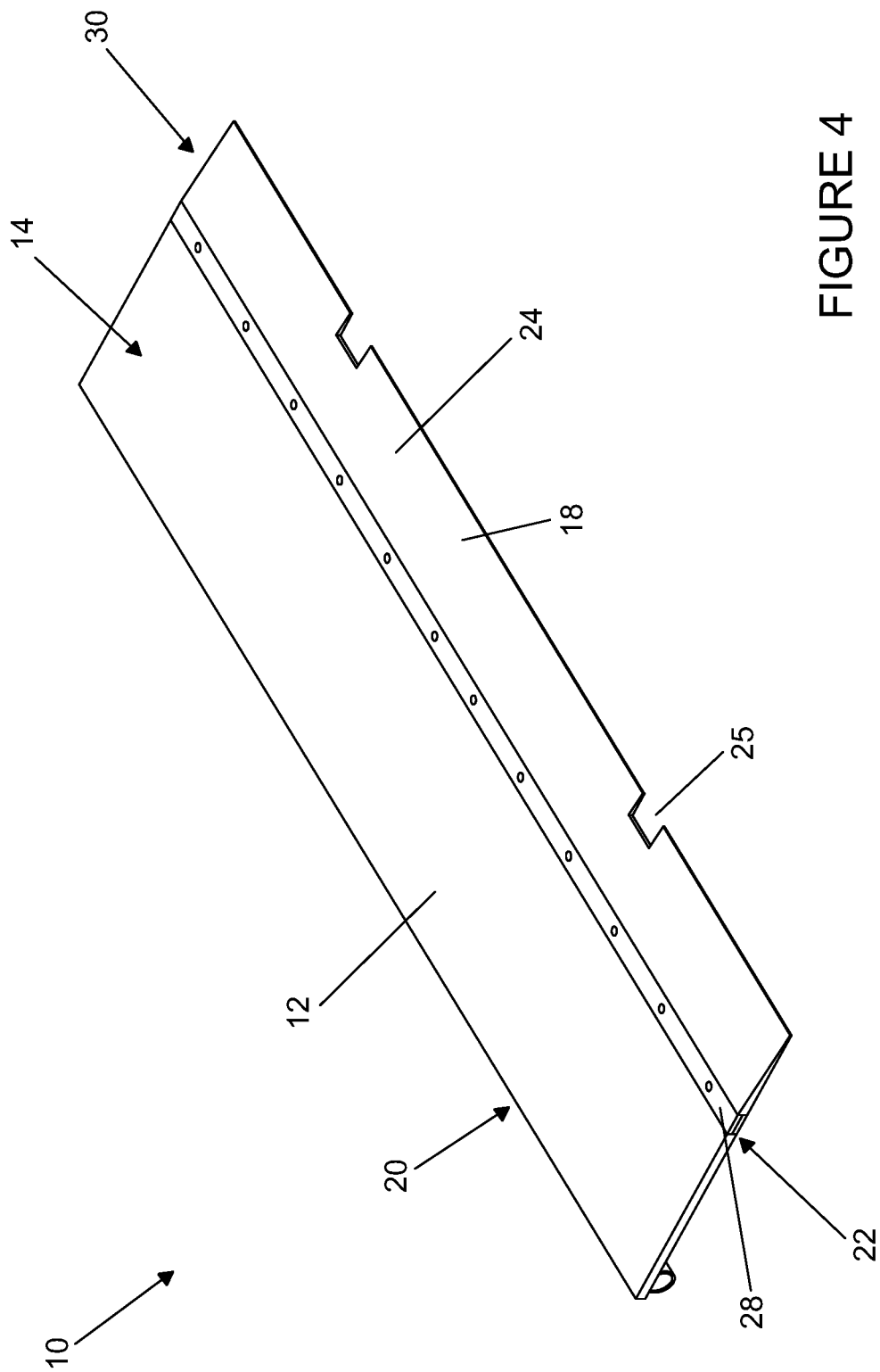
FIG. 4 is a top perspective view of a lip having a lip attachment, according to an embodiment.
Figure 5:
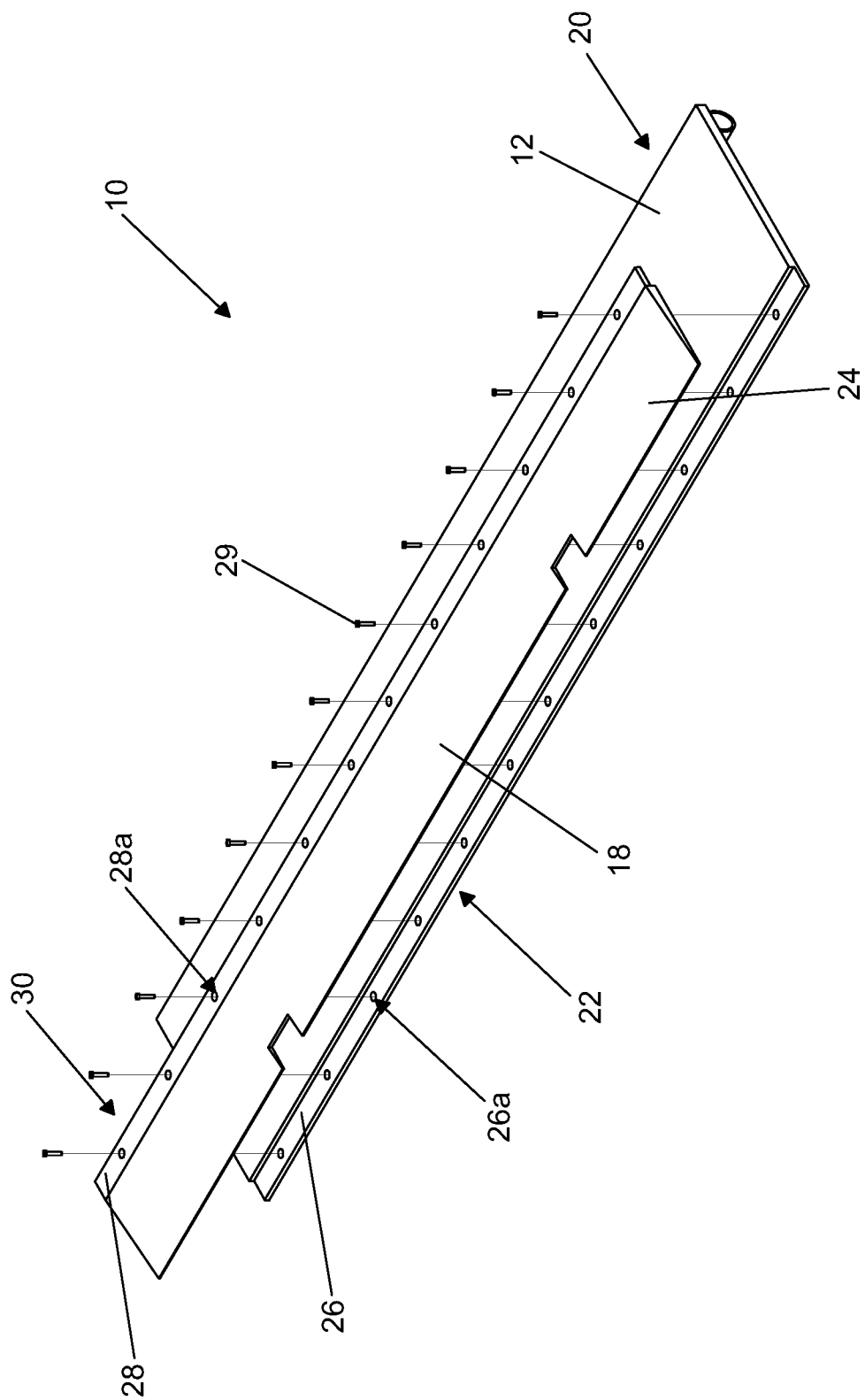
FIG. 5 is a top perspective view of the lip shown in FIG. 3, showing the lip attachment in a disconnected configuration, according to an embodiment.
Figure 6:
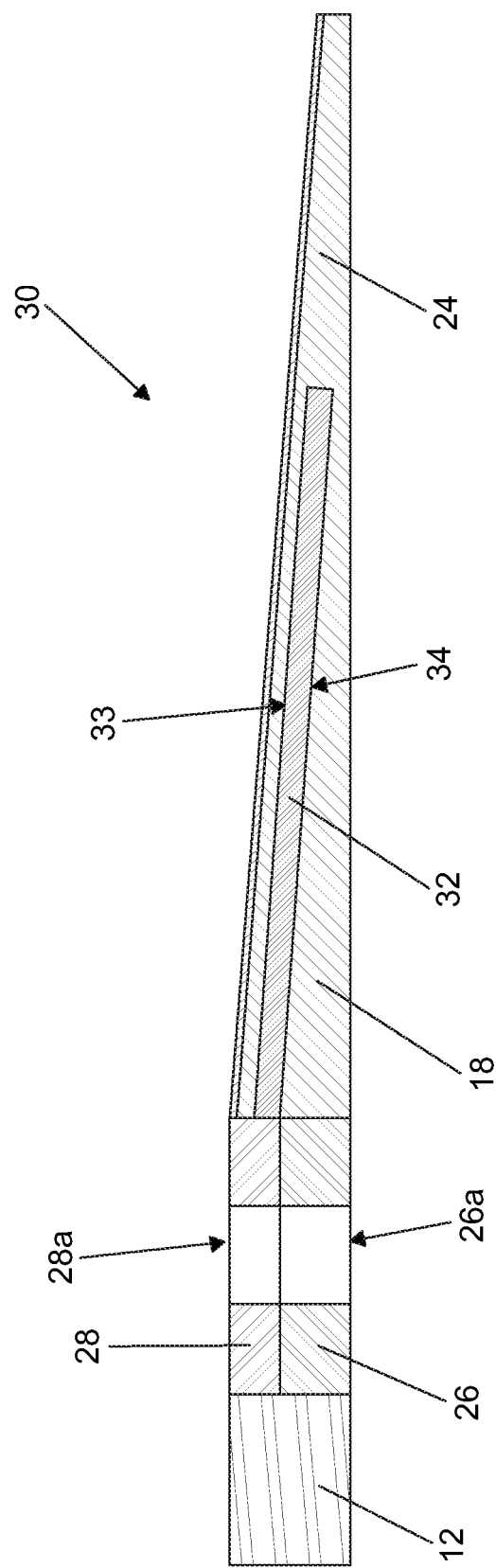
FIG. 6 is a cross-sectional view of the lip attachment shown in FIG. 3, according to an embodiment.

Now referring to FIGS. 4 to 6, another embodiment of the lip 10 is shown. In this embodiment, the lip 10 comprises the elongated body 12 and a lip attachment 30 connectable to the elongated body 12 in a manner that will be described hereinbelow. In this embodiment, the elongated body 12 comprises a first connecting surface 26 positioned along the front edge 22. Furthermore, the lip attachment 30 comprises a second connecting surface 28 adapted to be removably connected to the first connecting surface 26 in order to effectively attach the lip attachment 30 to the elongated body 12. More specifically, the first connecting surface 26 extends outwardly from the front edge 22 so as to receive the second connecting surface 28 thereon, as illustrated in FIG. 5.

The connecting surfaces can be connected to one another via mechanical fasteners 29 to allow workers to replace the lip attachment 30 if needed (maintenance, upkeep, etc.). In this embodiment, the first and second connecting surfaces 26, 28 respectively include a plurality of holes 26a, 28a adapted to align with each other in order to insert the mechanical fasteners 29 therethrough. A non-limiting example of the connection can consist of screws inserted within threaded holes. It should be understood that, in the present embodiment, the first and second connecting surfaces are parallel to each other, and can be further parallel to the substantially flat elongated body 12 so as to provide an overall stable and flat working surface. It should be apparent to a person skilled in the art that having a stable and flat surface can facilitate worker operations, especially when carrying goods to and from a truck for example.

In some embodiments, the lip attachment 30 can be connected to the elongated body 12 using any other suitable means. For example, the connecting surfaces 28, 28 can be connected to one another via an adhesive, or via welding. It should be understood that, in order to adhere or weld the connecting surfaces 26, 28 to one another, said surfaces 26, 28 are complementarily shaped. For example, if the first connecting surface 26 is substantially vertical (i.e., at the front edge 22 of the elongated body 12), the second connecting surface 28 will also be substantially vertical so as to facilitate connecting the surfaces to one another.

Referring more specifically to FIG. 6, the lip attachment 30 comprises a distal edge 32 extending from the second connecting surface 28. In this embodiment, the distal edge 32 can include a rectangular plate having top and bottom surfaces 33, 34. Moreover, the distal edge 32 can be downwardly inclined with respect to the second connecting surface 28. More specifically, the inclination of the distal edge 32 can be between about 0.5 to about 20 degrees, but can alternatively be any suitable inclination. In this embodiment, the connecting surfaces 26, 28 and the distal edge 32 are made from a metallic material, preferably the same material as the elongated body 12 (e.g., steel). It will be understood that, in the context of this disclosure, the contact between the connecting surfaces is "metal-on-metal". However, a protective rubber strip (not shown) can be introduced between said surfaces to reduce said direct contact.

In this embodiment, the cover lining 18 is adapted to at least partially enclose the lip attachment 30. More particularly, the cover lining 18 can enclose the top and bottom surfaces of the distal edge 32 so as to mitigate impacts occurring on the lip attachment 30. The cover lining 18 can be attached to the lip attachment using any suitable method, such as the methods previously described. In the present embodiment, the leading edge 24 extends further than the distal edge 32 so as to provide a flexible outer edge to the lip attachment 30. In this embodiment, the portion of the cover lining 18 covering the top surface 33 of the distal edge 32 can be parallel to said distal edge 32, while the portion of the cover lining 18 covering the bottom surface 34 of the distal edge can be parallel to the elongated body 12. As such, the cover lining 18 is tapered, having a decreasing thickness as it extends from the connecting surfaces 26, 28 to the leading edge 24, as illustrated in FIG. 6. In an alternate embodiment, the cover lining 18 can extend over the first and second connecting surfaces in order to provide additional protection to the lip attachment 30 by covering all metallic parts, as will be described below.

Figure 7:
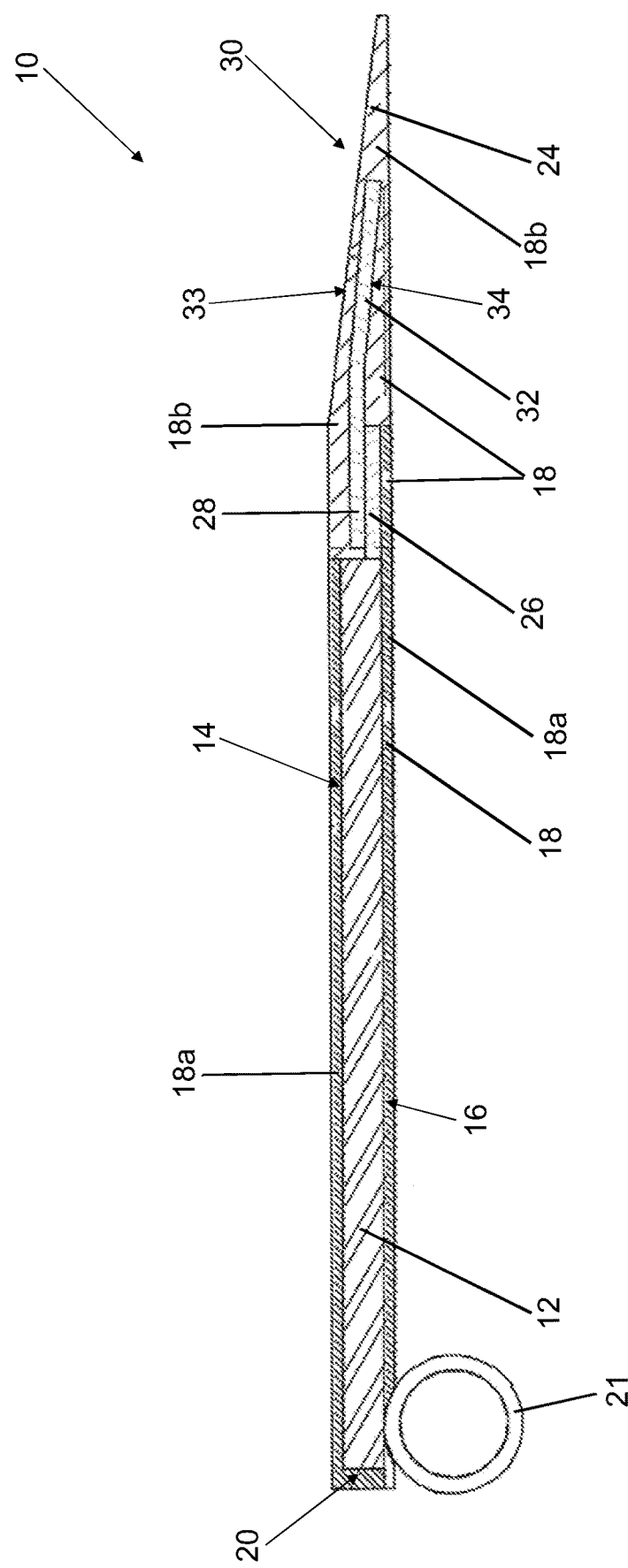
FIG. 7 is a cross-sectional view of a lip, showing a cover lining surrounding an elongated body and a lip attachment, according to an embodiment.

Now referring to FIG. 7, another embodiment of the lip 10 is shown. In this embodiment, the cover lining 18 effectively covers both the lip attachment 30, as described above in relation with the embodiments of FIGS. 4 to 6, and the elongated body 12, in order to provide additional protection to the lip 10 as a whole. In the present embodiment, the cover lining 18 includes a first portion 18a adapted to substantially enclose the elongated body 12, including the bottom of the first connecting surface 26. The cover lining 18 can further include a second portion 18b adapted to cover the lip attachment 30, including the top of the second connecting surface 28. It should be understood that the portion of the cover lining 18 covering the connecting surfaces is provided with holes to allow insertion of the mechanical fasteners to effectively connect the lip attachment 30 with the elongated body 12. Moreover, each portion of the cover lining 18a, 18b can be attached using any method described hereinabove in relation with the previous embodiments. Advantageously, in the present embodiment, any contact made with the lip 10 will be made on the cover lining 18 (i.e. on rubber), thus reducing/mitigating any impacts, shocks, vibrations and/or noises produced from equipment coming into contact with the lip 10.

Figure 8:
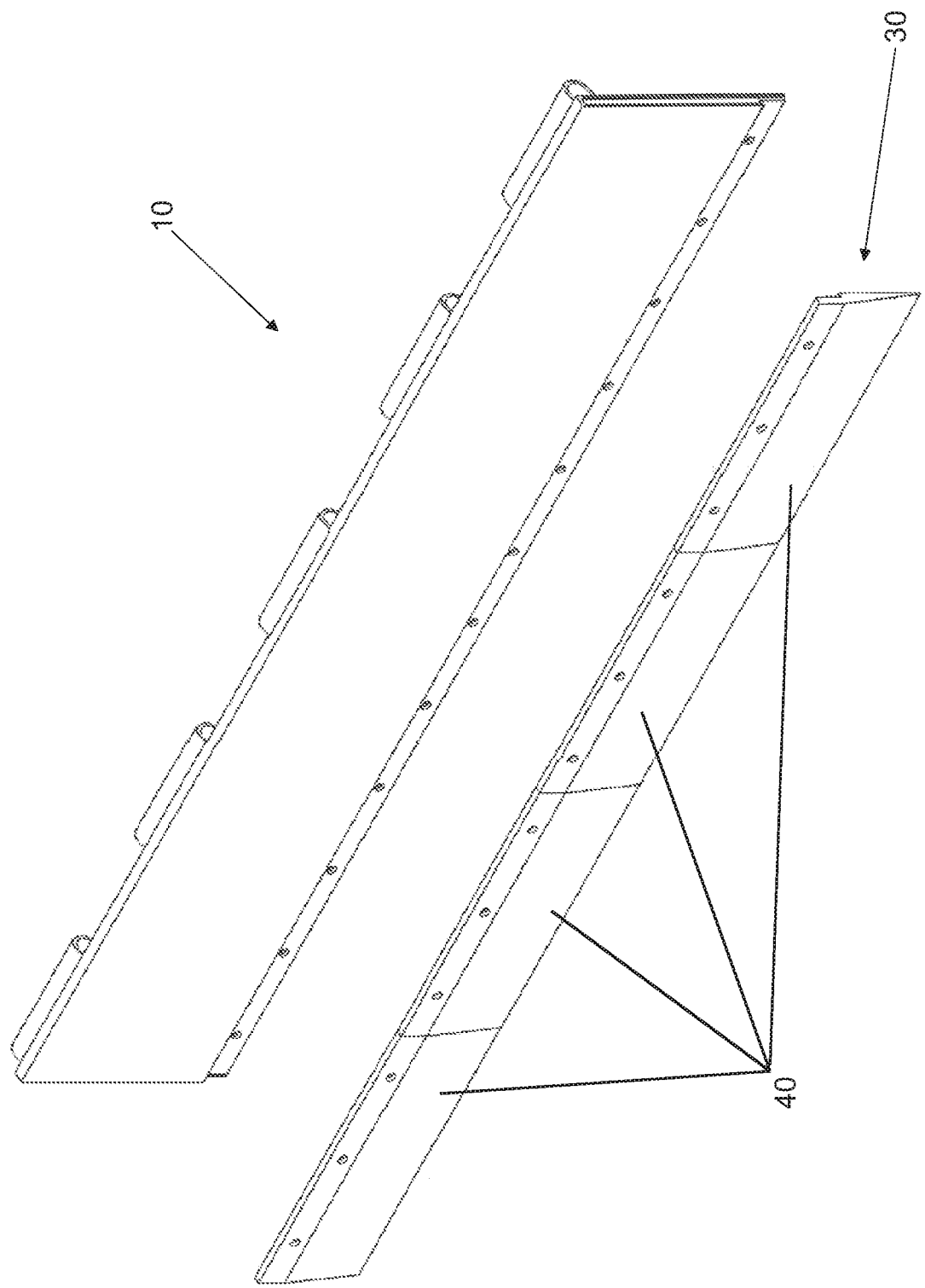
FIG. 8 is a perspective view of a lip having a plurality of lip attachment sections, according to an embodiment.

In some embodiments, the lip attachment 30 can be made of a plurality of sections 40, as illustrated in FIG. 8. In this embodiment, the lip attachment sections 40 provide improved flexibility to the lip attachment 30 so as to reduce wear and tear of the cover lining 18. The illustrated embodiment shows the lip attachment having four sections 40, however, it will be understood that the lip attachment 30 can be provided with any suitable number of sections 40. It will also be understood that having more sections 40 can provide additional flexibility, but can require more maintenance and/or upkeep due to the plurality of parts. In some embodiments, the lip attachment sections can be provided with one or more recess, as previously described, in order to provide greater flexibility to each individual section 40 of the lip attachment 30.

It will be appreciated from the foregoing disclosure that there is provided a lip of a dock leveler, which can be provided with a removable attachment, a cover lining for better impact mitigation and features adapted to improve flexibility. As such, the lip can offer substantial improvements over the known prior art in that, in virtue of its design and components, as explained herein, it advantageously enables to a) absorb/mitigate impacts, shocks, vibrations and/or noises that would occur from warehouse equipment such as forklifts; b) increase lifetime expectancy of the various components comprising the lip, and many more. However, the scope of the claims should not be limited by the preferred embodiments set forth in the examples, but should be given the broadest interpretation consistent with the description as a whole.

The invention claimed is:

1. A lip hingedly connectable to a deck of a dock leveler, the lip comprising:
   an elongated body having opposite top and bottom surfaces, the elongated body comprising:
      a hinged edge removably and pivotally connectable to the deck;
      a front edge opposite the hinged edge; and
      a first connecting surface positioned along the front edge;
   a lip attachment having
   a second connecting surface removably connectable to the first connecting surface and a lip attachment plate extending from the second connecting surface, the lip attachment plate having a distal edge; and
   a cover lining adapted to enclose at least one of the elongated body and the lip attachment plate so as to mitigate impacts thereon, the cover lining being at least partially flexible and having a leading edge extending further than the distal edge of the lip attachment plate to provide a flexible outer edge to the lip attachment.

2. The lip according to claim 1, wherein the first and second connecting surfaces are substantially parallel to each other.

3. The lip according to claim 1, wherein the elongated body is substantially flat, and wherein the first and second connecting surfaces are substantially parallel to the elongated body.

4. The lip according to claim 1, wherein the lip attachment plate is downwardly inclined with respect to the second connecting surface.

5. The lip according to claim 1, wherein the second connecting surface is connectable to the first connecting surface via mechanical fasteners or via welding.

6. The lip according to claim 1, wherein the cover lining is made of rubber crosslinked through a vulcanization process, the rubber having a hardness between about 50 and 90 on the durometer scale and being adapted to absorb/mitigate impacts, shocks, vibrations and/or noises.

7. The lip according to claim 6, wherein the rubber is reinforced with fibers, fabrics and/or felts.

8. The lip according to claim 6, wherein the cover lining is attached to the elongated body and/or the lip attachment via adhesive, mechanical fasteners and/or during the vulcanization process.

9. A lip attachment connectable to a lip of a dock leveler, the lip comprising an elongated body having opposite top and bottom surfaces, a hinged edge removably and pivotally connectable to the dock leveler, a front edge opposite the hinged edge and a first connecting surface positioned along said front edge, the lip attachment comprising:
 a second connecting surface connectable to the first connecting surface;
 a lip attachment plate extending from the second connecting surface, the lip attachment plate having a distal edge; and
 a cover lining adapted to enclose the lip attachment plate and being adapted to mitigate impacts on the lip attachment, the cover lining being at least partially flexible and having a leading edge extending further than the distal edge of the lip attachment plate to provide a flexible outer edge to the lip attachment.

10. The lip attachment according to claim 9, wherein the leading edge is tapered.

11. The lip attachment according to claim 10, wherein the leading edge includes at least one recess defined along a length thereof.

12. The lip attachment according to claim 9, wherein the first and second connecting surfaces are substantially parallel to each other.

13. The lip attachment according to claim 9, wherein the elongated body is substantially flat, and wherein the first and second connecting surfaces are substantially parallel to the elongated body.

14. The lip attachment according to claim 9, wherein the second connecting surface is connectable to the first connecting surface via mechanical fasteners or welding.

15. The lip attachment according to claim 9, wherein the cover lining is made of rubber crosslinked through a vulcanization process, said rubber having a hardness between about 50 and 90 on the durometer scale and being adapted to absorb and/or mitigate impacts, shocks, vibrations and/or noises.

16. The lip attachment according to claim 15, wherein the rubber is reinforced with fibers, fabrics and/or felts.

17. The lip attachment according to claim 15, wherein the cover lining is attached to and encloses the lip attachment via adhesive, mechanical fasteners and/or during the vulcanization process.

18. The lip according to claim 1, wherein the first connecting surface, second connecting surface and lip attachment plate are made of metal, and wherein the cover lining is made of rubber and encloses the metallic lip attachment plate.

19. The lip attachment according to claim 9, wherein the first connecting surface, second connecting surface and lip attachment plate are made of metal, and wherein the cover lining is made of rubber and encloses the metallic lip attachment plate.

* * * * *